United States Patent [19]

Ozawa et al.

[11] Patent Number: 4,937,620
[45] Date of Patent: Jun. 26, 1990

[54] METHOD OF FOCUSING PRINTER

[75] Inventors: Yoshio Ozawa; Takashi Yamamoto; Takao Shigaki, all of Kanagawa, Japan

[73] Assignee: Fuji Photo Film Co., Ltd., Kanagawa, Japan

[21] Appl. No.: 305,135

[22] Filed: Feb. 2, 1989

[30] Foreign Application Priority Data

Feb. 5, 1988 [JP] Japan .................................. 63-25513
Feb. 5, 1988 [JP] Japan .................................. 63-25514

[51] Int. Cl.$^5$ .............................................. G03B 27/32
[52] U.S. Cl. .......................................... 355/77; 355/55
[58] Field of Search ................................ 355/55, 56, 77

[56] References Cited

U.S. PATENT DOCUMENTS 4,789,880 12/1988 Mori et al. ............................ 355/55
4,806,988 2/1989 Verner .................................. 355/55

Primary Examiner—Richard A. Wintercorn
Attorney, Agent, or Firm—Sughrue, Mion, Zinn, Macpeak & Seas

[57] ABSTRACT

A method of focusing a printer in which the focusing of a lens is effected in accordance with an AF curve, printing is effected at an every predetermined pitchs while the lens is being moved by predetermined pitchs each along an optical axis starting from an initial position of the lens and then a lens position is selected at which optimum focus is obtained on the basis of printed images. The printing is repeated while the predetermined pitch is sequentially being made finer, in a case where the predetermined pitch differs from a pitch corresponding to the minimum resolving power of the lens. Thus, the AF curve is compensated for on the basis of the lens position which was selected during the printing at the pitch corresponding to the aforesaid minimum resolving power. Accordingly, it is possible to select an optimum lens position with high accuracy.

11 Claims, 4 Drawing Sheets

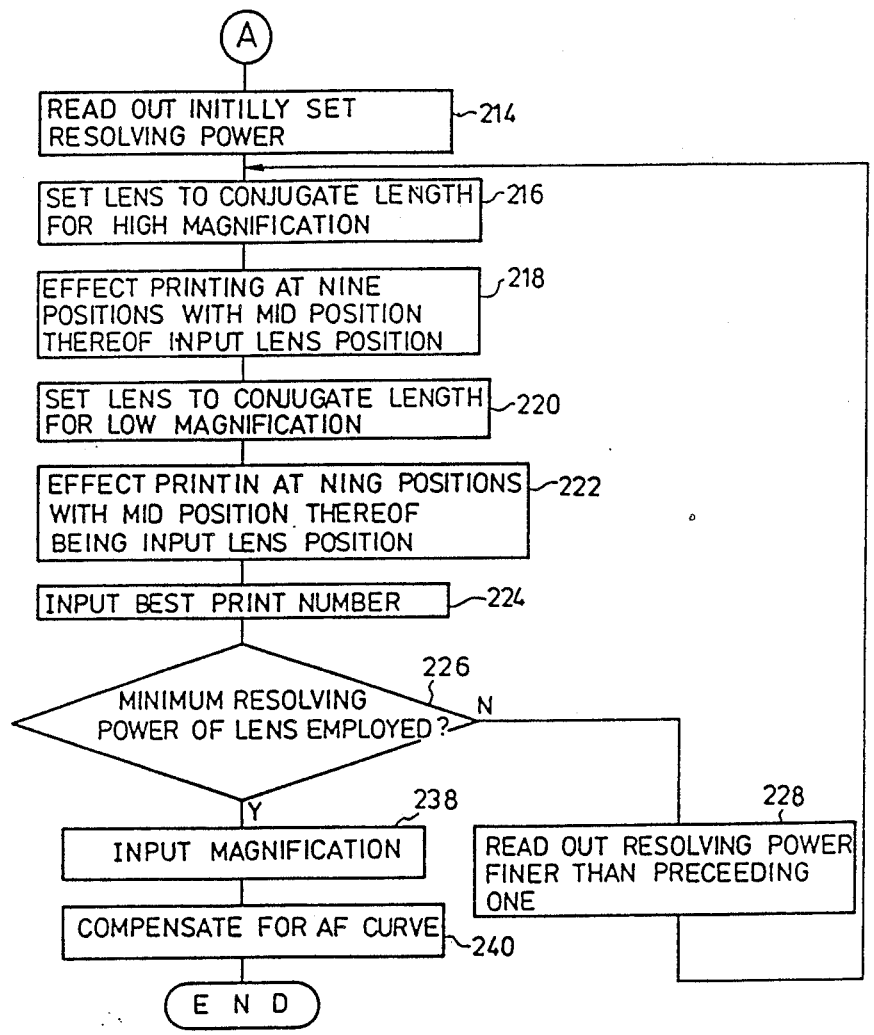

METHOD OF FOCUSING PRINTER

BACKGROUND OF THE INVENTION

1. Field of the Invention

The present invention relates to a printer focusing method capable of being used with a printer which is arranged to determine a printing size by altering the position and conjugate length of a printing lens.

2. Description of the Related Art

Photographic films are of several types: 135 film (35 mm format), 120 film (Brownie film), 110 film and so forth. In addition, the same photographic film includes a full-frame format and a half-frame format. To handle these various formats, a known type of printer is arranged to alter a printing size by moving a printing lens and by altering the conjugate length of a printing optical path. The amount of movement of the lens and the conjugate length can be obtained from an AF curve. The following is a description of a conventional method for obtaining the AF curve.

FIG. 3 is a schematic view of a printer. A negative film 60 is irradiated by a light source (not shown). The light is transmitted through the negative film 60 and irradiates a photographic paper 62 through a lens 62, thereby effecting printing on the photographic paper 64. In this case, the following equation is obtained from a first lens formula $$\frac{1}{A} + \frac{1}{S-A} = \frac{1}{f} \quad \text{Equation (1)}$$

where
- A is distance between the lens and the negative film,
- S is conjugate length, and
- f is focal length of the lens.

Next, a magnification m1 is specified and, if the lens is focused at the magnification m1, the following equation is obtained from the above equation (1)

$$\frac{1}{Ap + A'm1} + \frac{1}{Sp + S'm1 - (Ap + A'm1)} = \frac{1}{f} \quad \text{Equation (2)}$$

If a magnification m2 is specified and the lens is focused at the magnification m2, the following equation is likewise obtained $$\frac{1}{Ap + A'm2} + \frac{1}{Sp + S'm2 - (Ap + A'm2)} = \frac{1}{f} \quad \text{Equation (3)}$$

where
- Ap is distance between the negative film and a lens reference (compensation value),
- A' is distance between the lens reference and a lens position,
- Sp is distance between the negative film and a photographic-paper reference (compensation value),
- S' is distance between the photographic-paper reference and a photographic-paper position,
- A'm1 and S'm1 are A' and S' at the magnification m1, and
- A'm2 and S'm2 are A' and S' at the magnification m2.

Incidentally, A' and S' are values which are obtained by actual distance measurement (for example, by counting the number of feed pulses of a pulse motor). Ap and Sp are values which are obtained by calculations performed when it is assumed that the above equation (1) is obtained.

In this case, since A'm1, S'm1, A'm2 and S'm2 are the distances from the respective reference positions, their values are known, and the focal length f of each lens is also determined. Accordingly, Ap and Sp can be obtained from the above equations (2) and (3).

As can be seen from the following equation employing the thus-obtained Ap and Sp, if either Ap or Sp is determined, the other value can easily be obtained.

$$\frac{1}{Ap + A'} + \frac{1}{Sp + S' - (Ap + A')} = \frac{1}{f} \quad \text{Equation (4)}$$

In typical printers, it is generally required that focus and magnifications be accurately controlled. Accordingly, in an actual printing operation, it is necessary that accurate focus is obtained when a magnification has been input.

More specifically, if the amount of defocusing is within the permissible circle of confusion, the lens is regarded as focused. However, since the magnification varies within the in-focus range of the lens, compensation corresponding to the variation is needed.

Therefore, A' and S' are calculated at a predetermined magnification in accordance with the following procedures.

First, the following equation is obtained as a second lens equation $$\frac{S-A}{A} = m \quad \text{Equation (5)}$$

Then, as in the case of focusing, Am and Sm are obtained from the following equations $$\frac{Sm + S'm1 - (Am + A'm1)}{Am + A'm1} = m1 \quad \text{Equation (6)}$$

$$\frac{Sm + S'm2 - (Am + A'm2)}{Am + A'm2} = m2 \quad \text{Equation (7)}$$

By obtaining Am and Sm from equations (6) and (7), if either Am or Sm is determined, the other value can be obtained in the following equation $$\frac{Sm + S' - (Am + A')}{Am + A'} = m \quad \text{Equation (8)}$$

A' and S' are obtained from the simultaneous equations of equations (8) and (4).

The optimum values of Ap, Sp, Am and Sm are obtained by repeating the aforesaid focusing operations, and these optimum values are stored in a memory in a control section. Subsequently, only when a magnification m is input is it possible to easily obtain A' and S' which enable focusing at the magnification m.

However, such a focusing method has the following problems. If the lens is to be moved near an in-focus position, an operator operates a fine adjustment screw attached to a lens holder for focusing purposes. Accordingly, the amount of fine adjustment varies depending upon the manner of operation of each operator. It is difficult to return the lens position to a selected optimum focus position. As a result, operability is deteriorated. In addition, it is necessary to visually check the state of focus while projecting an image. However, such visual checking is difficult in the case of printers of the so-called normal vertical arrangement type in which a negative film is disposed above the photographic paper. On the other hand, the range of application of such a method is limited to printers of the so-called inverted vertical arrangement type in which a negative film is disposed below the photographic paper. Furthermore, where an image projected from a negative film is to be visually checked, no exact judgment as to focus can be performed since the luminous intensity of the image is low.

For these reasons, the present applicant proposes a method of obtaining a correct AF curve by altering a lens position within a predetermined range, effecting printing at each lens position, selecting a lens position at which optimum focus is obtained, and compensating for an AF curve on the basis of this lens position and a real magnification. These steps are repeated until the optimum focus position reaches the mid position of the aforesaid processing range (Japanese Patent Application No. 172381/1987).

In this proposed method, the AF curve is substantially automatically compensated for, the operation of an operator is simplified, and any error due to the manual operation of the operator is prevented.

However, this automatic focusing method has the following problems. Since focusing is performed together with the setting of a magnification, a relatively long focusing time is required to obtain an optimum focus position at a predetermined magnification. Therefore, the efficiency of operation is inferior. In addition, when a magnification corresponding to the optimum focus position is to be input, an operator may input an inaccurate value. Accordingly, there may be cases where no correct AF curve can be obtained.

SUMMARY OF THE INVENTION

It is, therefore, an object of the present invention to provide a method of focusing a printer that is capable of compensating for an AF curve in a short time while giving weight to the focus.

To this end, in accordance with the present invention, there is provided a method of focusing a printer by computing a lens position and a conjugate length in accordance with an AF curve and a set magnification. The method comprises the steps of fixing the distance between an original-image bearing film and photographic paper to provide a conjugate length according to a magnification which is set in advance; the positioning of a lens at an initial position, effecting printing at a predetermined pitch while moving the lens at the predetermined pitch at a time along an optical axis from the initial position as the original position, selecting a lens position, at which optimum focus is obtained, with reference to images obtained by the printing, repeating the printing by sequentially making the predetermined pitch finer, in a case where the predetermined pitch differs from a pitch corresponding to the minimum resolving power of the lens employed, and compensating for the AF curve on the basis of a real magnification and the lens position which was selected during the printing at the pitch corresponding to the minimum resolving power of the lens.

The predetermined conjugate length is selected at, for example, two positions for a high magnification and a low magnification, which positions are spaced apart by a long distance. The lens is positioned at the initial position based on each conjugate length. In this case, the distance between the original-image bearing film and the photographic paper is set at the aforesaid conjugate length. After the lens has been positioned, the lens position obtained at this time is set as the original position. The lens is then moved at a predetermined pitch at a time along the optical axis from the original position. In this case, it is preferable that the original position is an intermediate position between the upper and lower positions of a plurality of positions.

Thus, an optimum focus is selected. In this case, if the aforesaid predetermined pitch differs from a pitch corresponding to the minimum resolving power of the lens employed, the predetermined pitch is made finer to enhance the degree of accuracy and thus effecting printing. If the above operations are repeated and the predetermined pitch is sequentially made finer, it is possible to select an optimum lens position with high accuracy.

When the optimum lens position is thus selected during the printing at the pitch corresponding to the minimum resolving power of the lens employed, the AF curve is compensated for on the basis of the lens position and a real magnification. Thus, even if another magnification is selected, it is possible to obtain an optimum lens position and a conjugate length.

In the present invention, since focusing is effected at a fixed magnification (with the distance between the original-image bearing film and the photographic paper being fixed), the focusing time required to obtain a lens position where an optimum focus is obtained, is shortened and, therefore, the efficiency of operation is improved. In addition, since weight is given to focus, the quality of a finished image after printing is not inferior.

BRIEF DESCRIPTION OF THE DRAWINGS

FIGS. 2(A) and 2(B) are flow charts showing the procedures for focusing; and

DESCRIPTION OF THE PREFERRED EMBODIMENT

A preferred embodiment of the present invention will be described below with reference to FIGS. 1 to 2(B).

Figure 1:
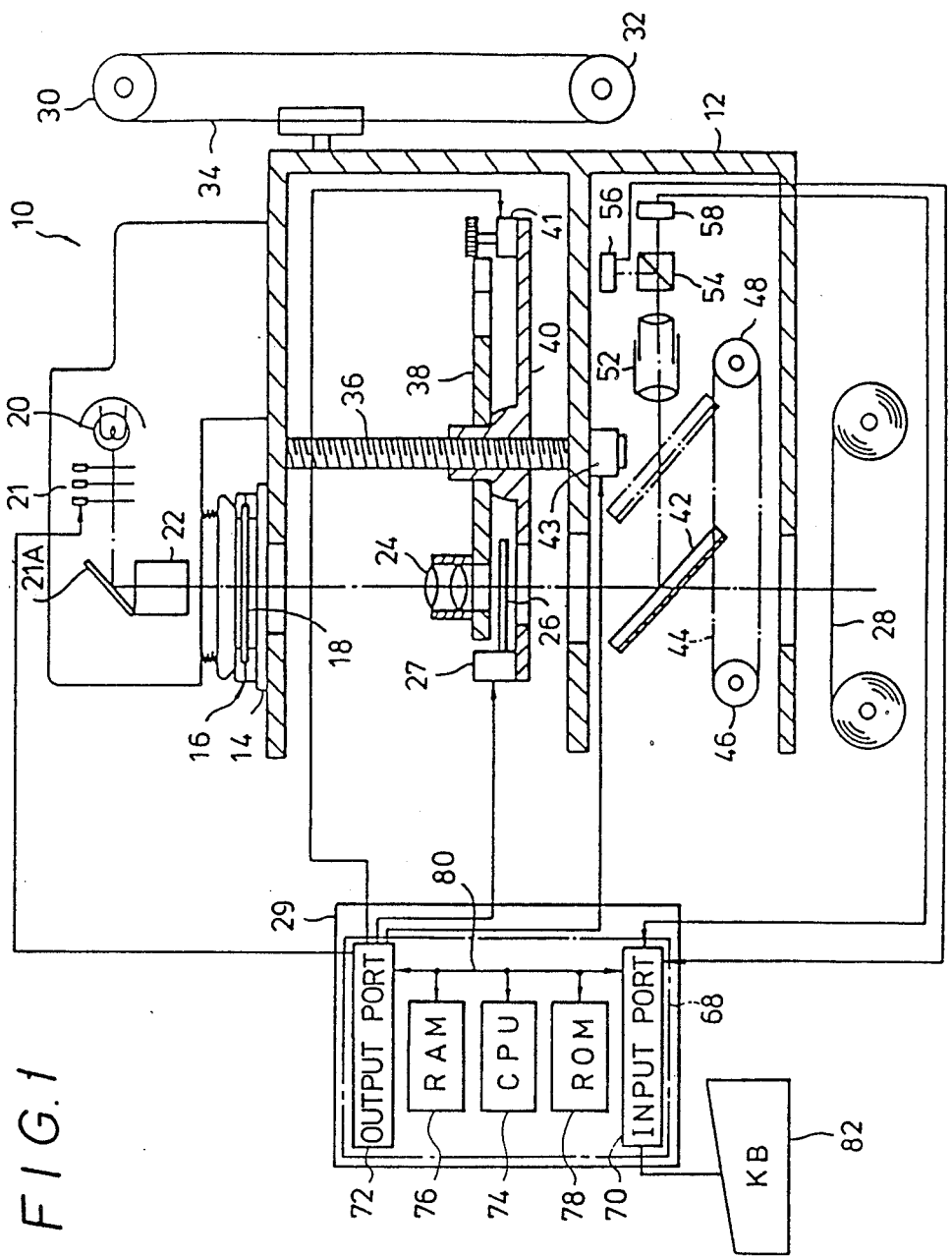
FIG. 1 is a diagrammatic view of the construction of a printer to which the present invention is applied.
Figure 2A:
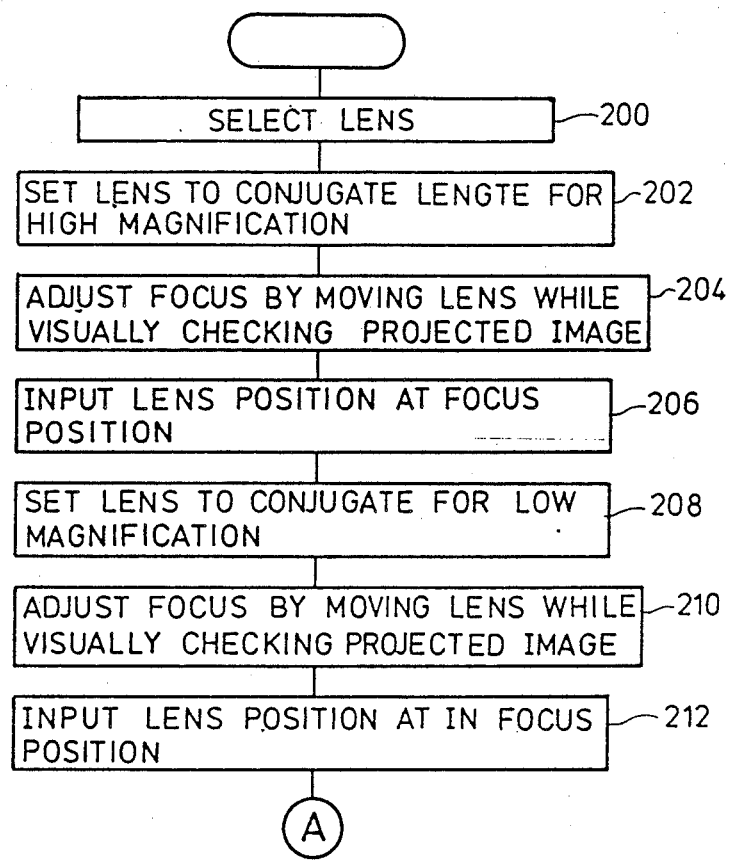
Figure 3:
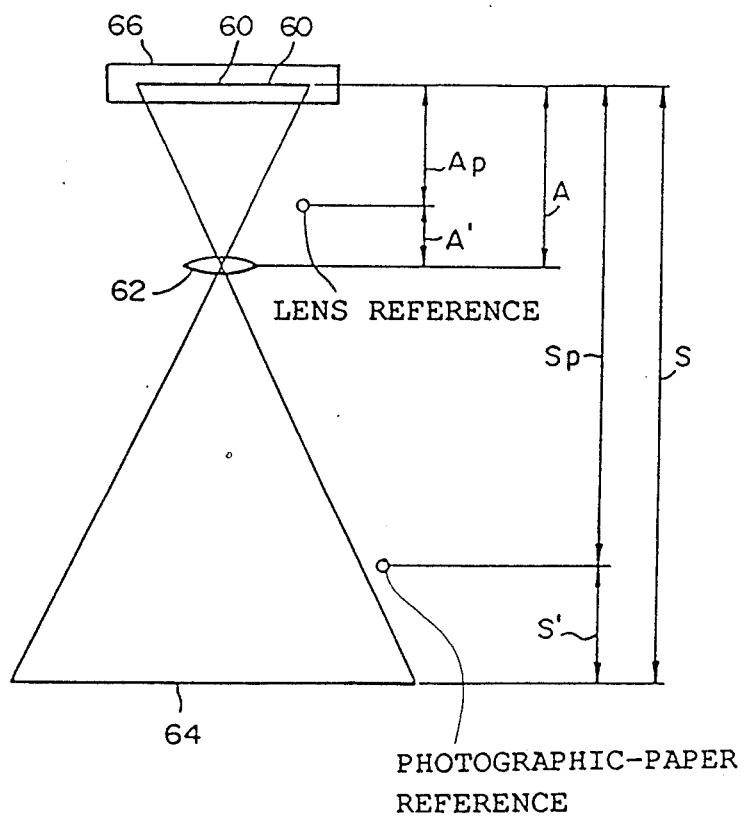
FIG. 3 is a schematic view of a printer, and serves to illustrate a method of focusing.

FIG. 1 shows a commercially erected printer 10 to which the present invention is applied. On a housing 12 is a base plate 14 for carrying a negative film carrier 16, into which a negative film 18 can be loaded.

In the housing 12, a light source 20, a YMC filter 21, a mirror 21A and a light diffusing cylinder 22 are disposed coaxially to the negative film carrier 16. A printing light is transmitted to a photographic paper 28 through a printing lens 24 and a shutter 26. The shutter 26 is driven by a driver 27 which is controlled by a signal output from a control device 29. The YMC filter 21 is also moved into and out of an optical axis by the signal output from the control device 29.

The housing 12 is secured to a portion of a belt 34 passed around pulleys 30 and 32. The belt 34 is capable of moving in an upward and downward direction as viewed in FIG. 1 by means of the pulleys 30 and 32. The pulleys 30 and 32 are driven by a driving force of a motor (not shown).

The printing lens 24 is attached to a turret 38 which is carried by a lifting table 40 supported by the housing 12 for movement along the axis of a screw shaft 36. The turret 38 can be rotated by the driving of a motor 41, which is attached to the lifting table 40. Thus, another printing lens on the optical axis can be located. Rotation of the lifting table 40 is normally inhibited. However, as the screw shaft 36 is rotated by the driving force of the motor 43, the lifting table 40 together with the turret 38 moves up and down to alter the position of the printing lens 24.

A reflection mirror 42 is disposed on the housing 12 so as to slide in a horizontal direction. A portion of the reflection mirror 42 is secured to a belt 44 which is passed around pulleys 46 and 48. As the pulleys 46 and 48 are driven by a rotating force of a motor (not shown), the mirror 42 is caused to move in a left and right direction as shown in FIG. 1 so as to move into and out of the optical axis.

The mirror 42 reflects a printing light emitted from the light source 20 and transmits the printing light to two image sensors 56 and 58 through a zoom lens 52 and a beam splitter 54. Negative images of a size corresponding to the size of the negative film 18 are focused on the image sensors 56 and 58 respectively, by the zoom lens 52, and the light density of each point in these negative images is measured by scanning. Data obtained from the light measurement is supplied to the control device 29, where exposure time is computed.

The control device 29 is constructed to include a microcomputer 68 which consists of an input port 70, an output port 72, a CPU 74, a RAM 76, a ROM 78 and buses such as a control bus and a data bus which connect them. A key board 82 is connected to the input port 70 of the control device 29. Data, such as a magnification and the size of a negative film, can be entered by operating the keys of the key board 82. In addition, the key board 82 can be used to input a number which is attached to photographic paper after the completion of a printing process. This will be described later. The key board can also be used to input the lens position required to specify the current position of the printing lens 24 (for example, to automatically memorize the lens position of a key operation).

In the printing apparatus 10 according to the present embodiment, the housing 12 is positioned at both a position for a high magnification and a position for a low magnification prior to a sequence of printing steps so as to compensate for a predetermined equation (or AF curve) to obtain the lens position and a conjugate length. That is to say, when the printing lens 24 is set in position, the motor 43 is driven on the basis of the lens position and the conjugate length obtained from the AF curve to effect focusing of the printing lens 24.

The control device 29 stores in advance various kinds of pitch size (resolving power) for fine adjustment of focus. The lifting table 40 is positioned at four positions above and below the aforesaid in-focus lens position as viewed in FIG. 1, and printing is effected at each position (nine positions including the in-focus lens position). During this time, numbers 1 to 9 are attached sequentially to the reverse side of the printing paper 28 by a numbering device (not shown) from the lower lens position (the lower side in FIG. 1) to the upper lens position. In the control device 29, the numbers can be made to correspond to the respective lens positions.

An operator effects the aforesaid printing process at two predetermined positions for a high magnification and a low magnification. The operator also selects an optimum focus position and inputs to the control device 29 the number attached to the thus-selected frame on the printing paper 28. Since the minimum resolving power differs in accordance with the type of printing lens 24 employed, the printing process is repeated as required while the aforesaid resolving power is made finer in a step-by-step fashion.

Prior to the above-described operation, the operator positions the housing 12 at each of the predetermined positions for high and low magnifications, projects an image, and manually effects focusing while visually observing the projected image. In general, the in-focus positions at the aforesaid magnifications may be found from the AF curve before compensation. However, if the result of computations using the AF curve substantially deviates from an actual in-focus position, the time period required for compensation is long. For this reason, in the present embodiment, the operator carries out focusing on the basis of his visual judgment, and the thus-obtained focus position is utilized as an initial focus position so that the required focusing time may be shortened.

The operation of the present embodiment will be described below.

First, the operation of a normal printing process will be explained. Printing light emitted from the light source 20 is diffused in the light diffusing cylinder 22 and illuminates the negative film 18. Light transmitted through the negative film 18 is passed through an aperture in the turret 38 and reflected by the mirror 42 in a horizontal direction. The light thus reflected passes through the zoom lens 52 and is split into two beams by the beam splitter 54. The two beams are incident upon the respective image sensors 56 and 58. Thus, a negative image of a size corresponding to the size of the negative film 18 employed is focused on each of the image sensors 56 and 58 by the zoom lens 52, and the density of each point contained in the negative images is measured by scanning.

When the densities of the points in the respective negative images are measured by the image sensors 56 and 58, the amount of exposure for printing purposes is computed on the basis of the thus-obtained densities.

When printing, the turret 38 is rotated by the driving force of the motor 41 and the printing lens 24, which corresponds to a desired printing size, is inserted into the optical axis. Simultaneously, the mirror 42 travels to the right as viewed in FIG. 1 and moves out of the printing optical axis. The shutter 26 opens for a time period corresponding to the amount of exposure for printing, so that an image is printed from the negative film 16 onto the photographic paper 28.

If the printing size is to be altered, a printing-size specifying key (not shown) is operated. The lens position and the conjugate length are computed using the AF curve in accordance with the printing size thus specified, and the screw shaft 36 is rotated to move the turret 38 up and down. Simultaneously, the housing 12 moves up and down by a predetermined amount by the driving of the belt 34. This up and down movement changes the relative position between the negative film 18 and the printing lens 24, thereby changing the printing optical path and the conjugate length.

Prior to the above-described printing process, it is necessary to obtain an appropriate AF curve by compensating for the AF curve which serves to determine a lens position and a conjugate length in correspondence with a predetermined magnification. How to determine the appropriate AF curve will be explained below with reference to the flow charts of FIGS. 2(A) and 2(B).

First, in Step 200, a desired lens is selected from among a plurality of printing lenses. Then, in Step 202, the housing 12 is moved on the basis of a predetermined conjugate length of a position for a high magnification, thus positioning the housing 12. In this state, step 204, an image is projected. Focus is roughly adjusted by manually moving the lens while visually observing the image projected. It is not necessary to obtain an optimum focus position. This is because the focus position can be made to approach within a certain range, the optimum focus position by the above-described operation. In step 206, the lens position of the aforesaid in-focus position is input to the control device 29 for memorizing purposes.

Next, when the inputting of the lens position for a high magnification has been completed as in Step 206, the housing 12 is positioned on the basis of the conjugate length of the predetermined position for a low magnification. The process then proceeds to Step 210, in which an operation similar to Step 204 is performed. When an in-focus state is obtained, the process proceeds to Step 212, in which the lens position corresponding to the in-focus state is input into the control device 29 for memorizing purposes.

By performing the above-described operation, it is possible to make an initial lens position very close to an optimum position. Accordingly, it is possible to reduce the focusing time required for compensation for the AF curve.

After Step 212 has been completed, the process proceeds to Step 214 in FIG. 2(B), in which an initial resolving power is read out. A plurality of resolving powers are stored in advance, and the initial resolving power is of relatively rough pitch size.

In Step 216, the housing 12 is again positioned for high magnification as in Step 204. In Step 218, printing is effected at nine positions which are spaced apart at intervals of the pitch size of the resolving power read out with the mid position being the lens position memorized in Step 208. In this case, numbers 1–9 are printed in an ascending order from the lower side as viewed in FIG. 1. The process then proceeds to Step 220, in which the housing 12 is again positioned for low magnification as it was positioned in Step 210. The process then proceeds to Step 222, in which a printing process similar to that effected in Step 218 is performed. After the printing process has been completed, the photographic paper 28 is developed and the operator selects an optimum print number (hereinafter referred to as the "best print number"). In Step 224, the best print number is input. In Step 226, it is determined whether or not the set resolving power is the minimum resolving power of the printing lens 24 employed. If the answer is negative, the process proceeds to Step 228, in which a resolving power is one step finer than the previous resolving power. Subsequently, the processes of Steps 218, 220, 222, 224 and 226 are repeated until the set resolving power reaches the minimum resolving power of the printing lens 24 employed. If an affirmative answer is obtained in Step 226, the process proceeds from Step 226 to Step 238, where a magnification is input. In Step 240, the AF curve is compensated for on the basis of the lens position based on the magnification and the best print number.

As described above, in the present embodiment, magnification is not altered during focusing operation in order to give weight to focus and, when an in-focus state is finally obtained, the desired magnification is input. Accordingly, the focusing time required to obtain an in-focus state is shortened and the efficiency of operation is improved.

As described above, a method of focusing a printer in accordance with the present invention has an excellent advantage in that it is possible to compensate for the AF curve in a short time while giving weight to focus.

What is claimed is:

1. A method of focusing a printer by computing a lens position and a conjugate length in accordance with an AF curve and a set magnification, comprising the steps of:
    (a) fixing the distance between an original-image bearing film and photographic paper to provide a conjugate length according to a magnification which is set in advance;
    (b) positioning a lens at an initial position;
    (c) effecting printing at a predetermined pitch while said lens is being moved by said predetermined pitch along an optical axis starting from an initial position of said lens;
    (d) selecting a lens position, at which optimum focus is obtained, with reference to images obtained by said printing;
    (e) repeating said printing until said predetermined pitch reaches the minimum resolving power of said lens by sequentially making said predetermined pitch finer, in a case where said predetermined pitch differs from a pitch corresponding to the minimum resolving power of said lens employed; and
    (f) compensating for said AF curve on the basis of a real magnification and said lens position which was selected during said printing at said pitch corresponding to the minimum resolving power of said lens.

2. A method according to claim 1, further comprising a step (g) of roughly adjusting focus by projecting an image and moving said lens while visually checking said image projected, said step (g) being inserted between said steps (a) and (b).

3. A method according to claim 1, wherein said steps (b) to (e) are performed at two positions: a first lens position and a second lens position different from said first lens position.

4. A method according to claim 3, wherein said first lens position is a predetermined position for a high magnification with said second lens position being a predetermined position for a low magnification.

5. A method according to claim 1, wherein, in said step (c), said predetermined pitch is provided along said optical axis symmetrically with respect to said original position.

6. A method of focusing a printer, comprising the steps of:
    (a) roughly adjusting focus with reference to a projected image at an initial lens position which is positioned on the basis of a set magnification;
    (b) finely adjusting said focus to cancel an error between a roughly adjusted lens position and a lens position at which optimum focus is obtained;
    (c) compensating for an AF curve on the basis of a lens position after said fine adjustment; and
    (d) effecting focusing at said magnification by computing a lens position and a conjugate length on the basis of said compensated AF curve.

7. A method according to claim 6, wherein said steps (a) and (b) are performed at two positions: a first lens position and a second lens position different from said first lens position.

8. A method according to claim 7, wherein said first lens position is a predetermined position for a high magnification with said second lens position being a predetermined position for a low magnification.

9. A method according to claim 6, wherein said lens position of said step (b), at which said optimum focus is obtained, is selected on the basis of printed images which have been obtained by effecting printing at a predetermined pitch while said lens is being moved by said predetermined pitch each along an optical axis starting from said initial lens position.

10. A method according to claim 9, wherein said predetermined pitch is provided along said optical axis symmetrically with respect to said original position.

11. A method according to claim 10, wherein if said predetermined pitch differs from a pitch corresponding to the minimum resolving power of said lens, said printing is repeated while said predetemined pitch is sequentially made finer.

* * * * *